United States Patent [19]

Ressencourt

[11] Patent Number: 4,665,607

[45] Date of Patent: May 19, 1987

[54] MACHINE FOR WORKING SHEET MATERIAL SUCH AS SHEET METAL

[75] Inventor: Hubert Ressencourt, l'Etang-la-Ville, France

[73] Assignee: Raskin S.A., Switzerland

[21] Appl. No.: 738,247

[22] Filed: May 28, 1985

[51] Int. Cl.[4] .................... B23Q 3/155; B23K 26/00
[52] U.S. Cl. ........................... 29/568; 83/549; 29/33 R; 219/121 LG
[58] Field of Search ............ 83/549, 550, 551; 219/121 LG, 121 LK, 121 LL; 29/33 R, 568

[56] References Cited

U.S. PATENT DOCUMENTS

| | | | |
|---|---|---|---|
| 4,103,414 | 8/1978 | Herb et al. | 29/568 |
| 4,201,905 | 5/1980 | Clark et al. | 219/121 LG |
| 4,335,296 | 6/1982 | Bredow | 219/121 LK |
| 4,427,873 | 1/1984 | Orita et al. | 219/121 LL |
| 4,486,941 | 12/1984 | Scott et al. | 29/568 |

FOREIGN PATENT DOCUMENTS

| | | | |
|---|---|---|---|
| 189089 | 10/1984 | Japan | 219/121 LG |
| 223182 | 12/1984 | Japan | 219/121 LK |

*Primary Examiner*—Gil Weidenfeld
*Assistant Examiner*—Daniel W. Howell
*Attorney, Agent, or Firm*—Silverman, Cass, Singer & Winburn, Ltd.

[57] ABSTRACT

A machine comprises on the one hand a mechanical working device, for working sheet material by pressing or stamping, and on the other hand a laser working device. The mechanical working device comprises a gantry hydraulic press comprising a frame, a table, an hydraulic press ram and a slide member. Several tools are stored in a storage device from which they are brought, on rails, up to the axis of the press by means of a jack. The laser working device comprises a resonator producing a laser beam which is conducted up to the axis of the press through a tube and by a reflecting mirror located on the axis of the slide member. When the laser cutting head is not in service it is retracted within one of the columns of the frame of the press, a jack producing the displacement of the cutting head. This equipment enables the carrying out, on a common axis of working, of either mechanical punching, cutting, folding, cumbering and pressing operations, or working by means of the laser.

8 Claims, 13 Drawing Figures

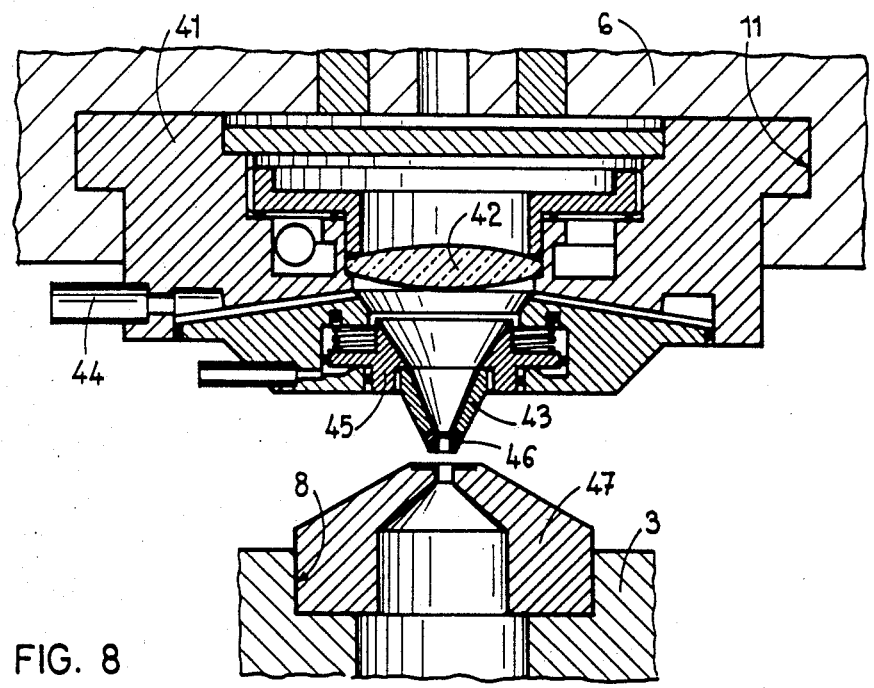
FIG. 8
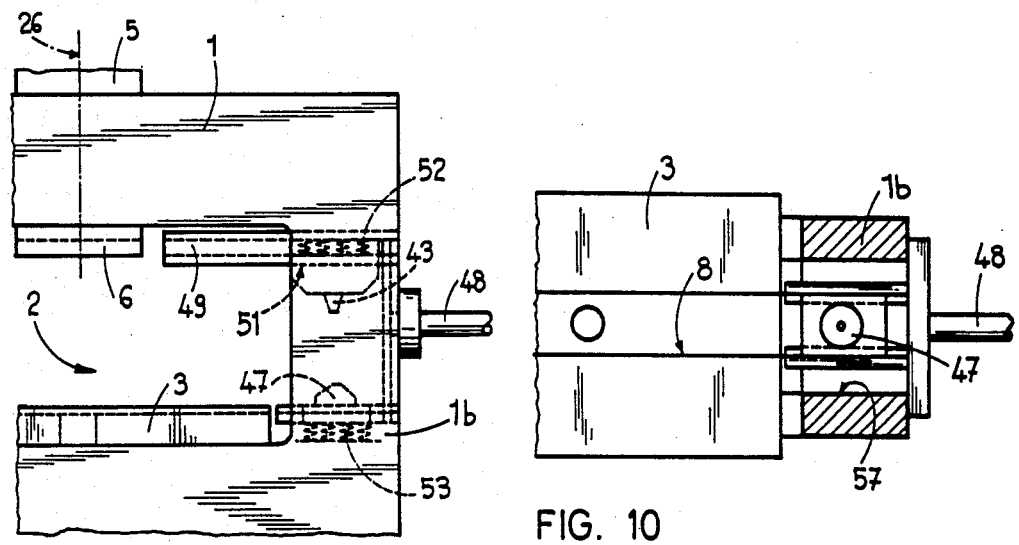
FIG. 9
FIG. 10

MACHINE FOR WORKING SHEET MATERIAL SUCH AS SHEET METAL

BACKGROUND OF THE INVENTION (a) Field of the Invention

The present invention relates to a machine for working sheet material, such as sheet metal, comprising at the same time means for mechanical working, operating by pressing or stamping, and laser working means.

(b) Description of the Prior Art

Such machines, comprising in combination a stamping device permitting the mechanical working of sheet material and a laser working device, are known per se. However, in known machines of this type, it is not possible to work on a single and common axis during the stamping and during the laser working. It is more a matter of the juxtaposition of two arrangements on a common frame, which obviously renders the machine inconvenient. As a matter of fact, it is necessary to move the workpiece, with the attendant need for a precise positioning or indexing between the stamping operations and the laser working, which is not favourable and a considerable drawback.

SUMMARY OF THE INVENTION

The object of the present invention is to overcome the aforesaid drawback.

To this end, the invention provides a machine comprising mechanical working means for sheet material and laser working means which both work on a single and common axis.

This machine of the invention comprises a retractable laser head able to occupy on the one hand a working position, in which it is situated on the mechanical stamping axis, and on the other hand a retracted position, in which it is situated away from this axis and allows passage of the stamping members, control means being operative for moving this laser head from one of the said two positions into the other one.

The various features of the invention will be apparent from the following description, drawings and claims, the scope of the invention not being limited to the drawings themselves as the drawings are only for the purpose of illustrating ways in which the principles of the invention can be applied. Other embodiments of the invention utilising the same or equivalent principles may be used and structural changes may be made as desired by those skilled in the art without departing from the present invention and the purview of the appended claims.

BRIEF DESCRIPTION OF THE DRAWINGS

FIGS. 3 to 10 are views, some of them in partial section and to a larger scale, of details of this machine.

DESCRIPTION OF THE PREFERRED EMBODIMENTS

The machine illustrated in FIGS. 1 to 10 is of the type called a "gantry machine" inasmuch as its frame, designated by reference 1, is provided with two columns 1a and 1b between which is provided a free space 2. A transverse member 1c of the frame carries the table of the machine, designated by 3, providing a press bed intended to receive the sheet to be worked, such as the iron sheet indicated at 4 in FIGS. 4 and 5.

Figure 1:
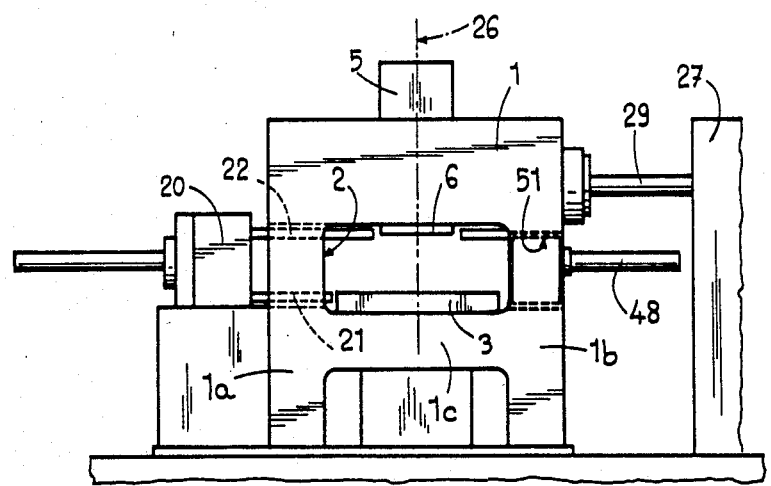
FIG. 1 is a front view of a first embodiment of a machine for use to work sheet material such as sheet metal.
Figure 2:
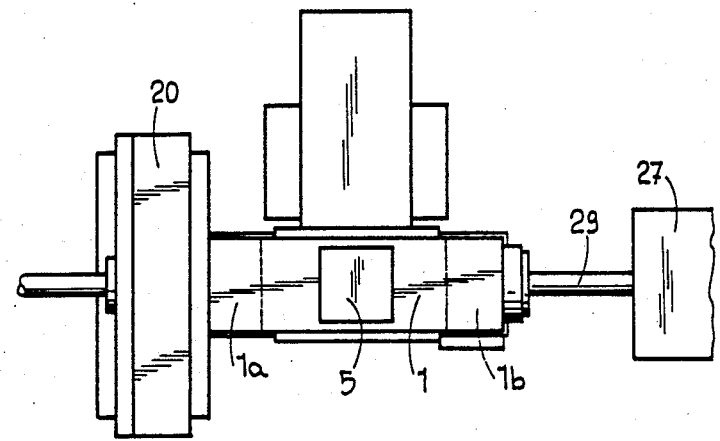
FIG. 2 is a view thereof from above.
Figure 3:
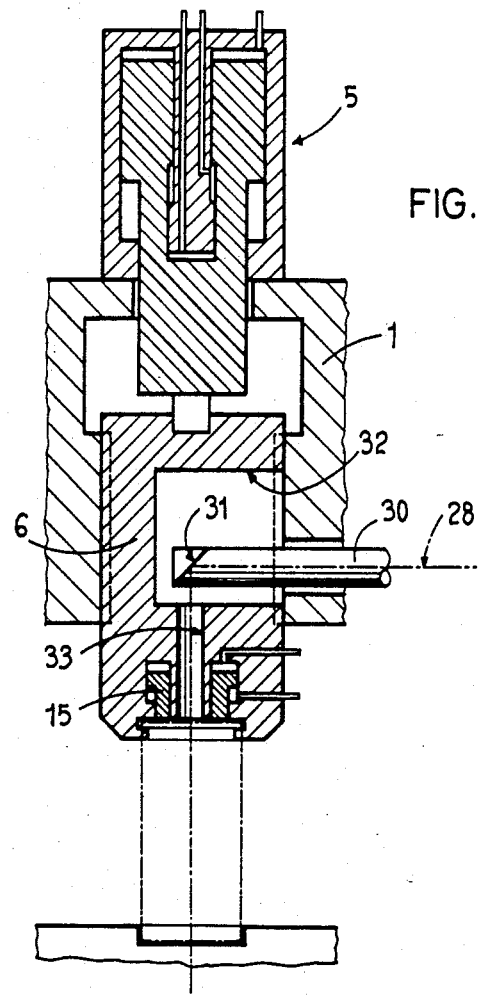
Figure 4:
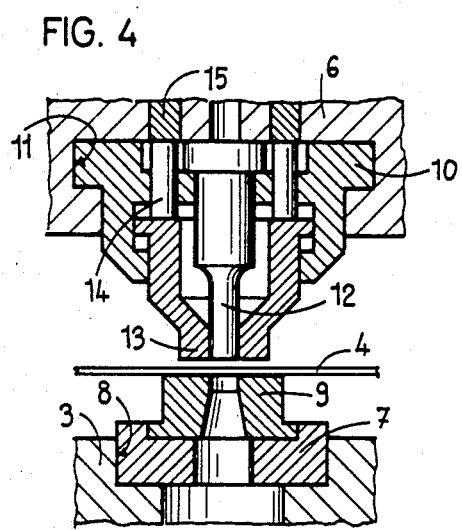

The machine comprises a mechanical press or stamping device comprising an hydraulic press ram 5 operating a slide member or stamper 6 (FIG. 3). This device is intended to operate press or stamping tooling such as shown in FIG. 4, for instance, or in FIG. 5.

Such tooling (FIG. 4) comprises a bolster 7, engaged in a transverse groove 8 of the table 3 and which carries a die 9. The tooling comprises moreover an upper punch-holder block 10 engaged in a transverse groove 11 of the stamper 6 and which carries a punch 12 as well as a blank holder 13. Pushrods 14 connect the blank holder 13 to a hydraulic jack 15 visible in FIG. 3. The punch 12 is intended to make holes in the sheet 4, in co-operation with the die 9.

Figure 5:
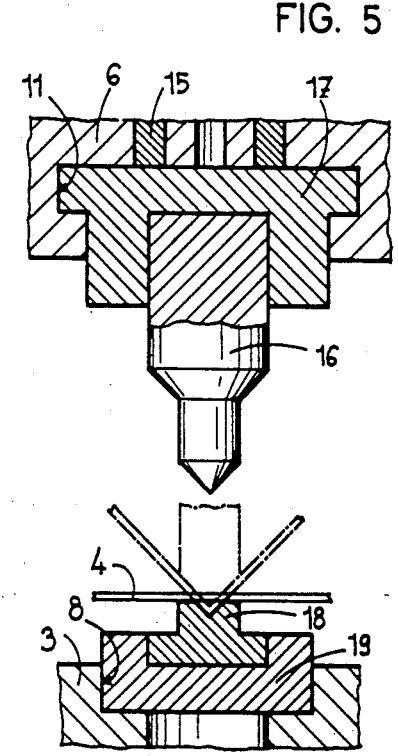
Figure 6:
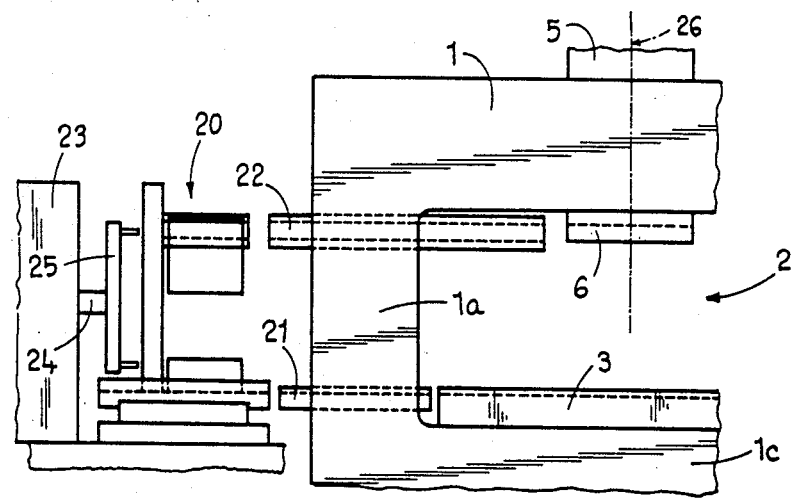

In FIG. 5 there is illustrated other tooling usable on the same machine, i.e. a folding punch 16 carried by a block 17 engaged in the groove 11 of the stamper 6 and which folds a sheet 4 in co-operation with a complementary die 18 carried by a bolster 19 engaged in the groove 8 of the table 3.

It is to be noted that any tool working the sheet by stamping can be used on the present machine, as well as for effecting the operations of punching, cutting, folding, cumbering, pressing or others.

The machine comprises a tool storage device or magazine 20 situated beside the column 1a of the gantry 1 and which is connected to the central part of the machine by two pairs of rails 21 and 22, ending respectively at the level of the transverse groove 8 of the table 3 and at the level of the transverse groove 11 of the stamper 6. A jack 23, the stem of which is designated by reference 24, acts through the intermediary of a transfer-bar (FIG. 6) on the tools contained in the storage device 20 to transfer them on to the rails 21, respectively 22, and to move them into alignment with the stamping axis, designated by reference 26.

The machine illustrated comprises, moreover, a laser device for working of the sheet material. This device comprises a laser generator 27 (FIG. 1) producing a laser beam diagrammatically represented by means of the axis 28 of FIGS. 3 and 7, radially directed with respect to the axis 26 of the machine and which is conducted, through two telescopic tubes 29 and 30, up to a mirror 31 secured to the inner end of the tube 30 and which reflects the laser beam in such a way as to bring it parallel to the axis 26 of the machine. This mirror is located in a recess 32 provided in the stamper 6 of the machine (FIG. 3), opposite a central passage 33 provided in the stamper and into which it reflects the laser beam.

The tube 30 is screwed within a sleeve 34 (FIG. 7) through which it passes and in which it is locked on the screw threads by a nut 35, so that its axial position is adjustable. Its angular position, about its own axis, can also be adjusted. Thus the positioning of the mirror 31 can be adjusted in such a way as to bring the laser beam into exact coincidence with the axis of the machine. The sleeve 34 is provided with a frusto-conical end surface 36 urged, by means of a jack 37, against a complementary seat 38 within a sleeve 39 carried by the column 1b of the frame of the machine. Finally, the sleeve 34 passes through a membrane 40, which is deformable and resilient, carried by the sleeve 39.

Figure 7:
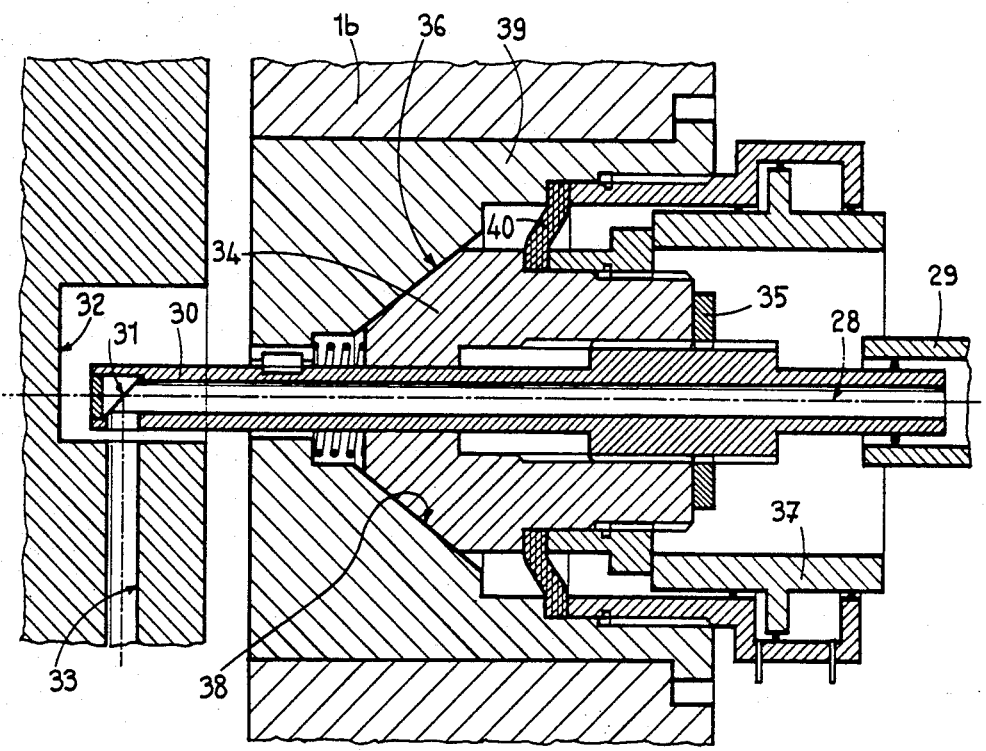

Owing to the present arrangement, the tube 30 can be pulled slightly towards the right side of FIG. 7 when the laser device is not in use, in such a way that it has no rigid contact with the machine, being resiliently supported by the member 40 in such manner that the mirror 31 is not subjected to the effect of the vibrations due to the mechanical stamping operation.

The laser beam reflected by the mirror 31 is brought up to a laser cutting head, illustrated in FIG. 8, which comprises a support 41 engaged in the groove 11 of the stamper 6 and which carries a focussing lens 42 and a nozzle 43 to which are supplied cutting gas through a duct 44. A jack 45 is operative to move the nozzle axially when it is desired to modify the position of this nozzle with respect to the focal point of the lens 42. It is to be noted that tubular distance members can be interposed between the nozzle 43 and the jack 45 in order to adapt the position of the nozzle to suit lenses of different focal lengths. The nozzle 43 carries, at its end, a capacitive pick-up or sensor 46 which enable the axial position of the stamper 6 to be controlled so as to maintain constant the position of the focal point, with respect to the surface of the member to be worked, when non-flat sheet materials have to be cut. The laser working device comprises moreover a lower block 47 engaged in the groove 8 of the table 3.

The upper and lower elements of the laser working device are subject to the action of a jack 48 (FIGS. 1, 9 and 10) which enables them to be slid on rails 49, so far as the upper portion is concerned, and in the groove 8 of the table 3 so far as the lower portion is concerned, until they enter into a recess 51 provided in the column 1b of the frame 1 of the machine. Once they are located in this recess, the elements of the laser device rest therein through the intermediary of a damping elastic device, diagrammatically represented as coil springs 52 and 53 in FIG. 9, which protects them from the effects of vibrations due to the mechanical stamping operation.

Thus, the mechanical stamping and the laser working can be effected successively on the same machine and on the same working axis, the laser head being able to be brought from its working position, in which it is coaxial with the axis 26, to its rest position in which it is fully retracted within the recess 51 of the column 1b of the frame. Simultaneously, the tube 30 and the mirror 31 which it supports are slightly retracted so as to allow free movement of the stamper 6 and so as to remain elastically supported by the membrane 40.

Figure 11:
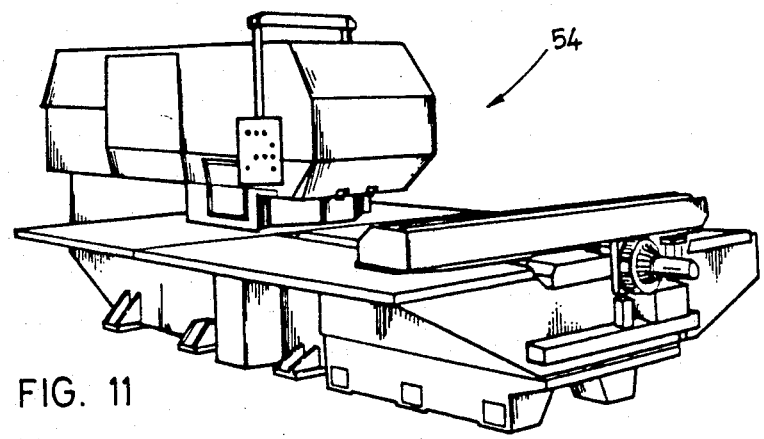
FIG. 11 is a perspective view of a machine belonging to a work centre comprising moreover a storage device which is not illustrated in this figure.

The present arrangement can also be applied to a work centre comprising a stamping machine such as the machine 54 diagrammatically represented in FIG. 11, being a machine of the type which is the subject of Swiss Patent Application No. 4.214/84 in the name of Raskin S. A., and a tool storage device such as the tool storage device 55, diagrammatically represented in FIG. 12, completely independent from the machine.

The machine 54, having a swan-neck, comprises two superposed turrets 56 and 57 arranged in such a way as to receive, radially plugged thereon, tool carrying pallets 58 supporting mechanical working tools (punches, dies), and which can also be plugged, laterally, into the storage device 55. A loading-unloading device, which is not illustrated, operates to transfer the pallet 58 from the storage device 55 on to one or the other of the turrets 56 and 57, in a movement indicated by the arrow 59 in FIG. 12, while turning them over, as indicated by the arrow 60 of this drawing figure.

Figure 12:
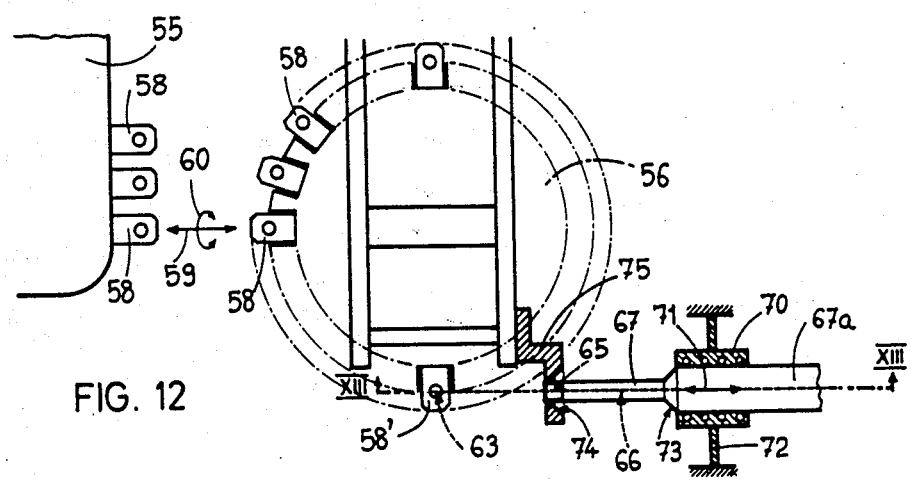
FIG. 12 is a plan view of a detail of the machine of FIG. 11 to a larger scale, diagrammatically illustrated, in which the tool storage device is diagrammatically also shown.
Figure 13:
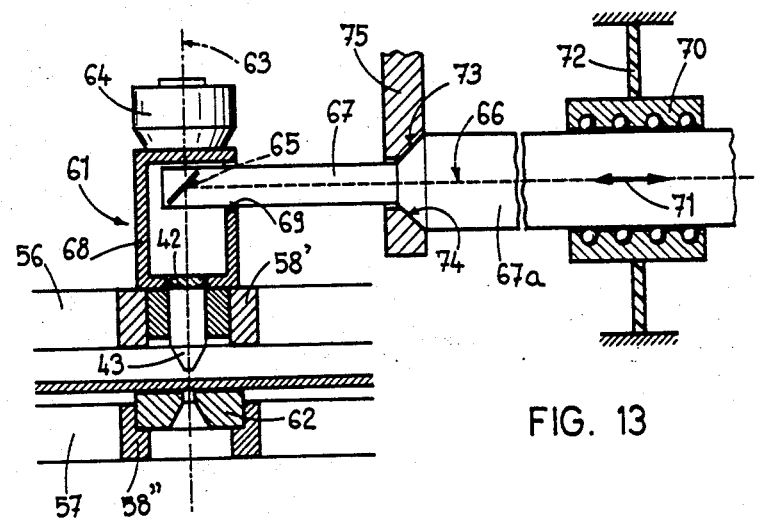
FIG. 13 is a sectional view of a detail of this machine, to a larger scale than that of FIG. 12, taken on the stamping axis of the machine.

It will be sufficient to provide that one of the pallets of the turret 56, designated by 58' in FIGS. 12 and 13, is provided with a laser head, such as the head 61 represented in sectional view in FIG. 13, and that one of the pallets of the turret 57, designated by 58", is provided with a lower block 62, similar to the lower block 47 of the first embodiment, to enable the laser head and its lower block to be transferred on to the working axis 63 of the machine, in place of a pair of mechanical tools (punch and die). The machine will be arranged in such a way that the laser head 61 can pass under the stamper of the machine, indicated at 64 in FIG. 13, so as to occupy a retracted position.

When the machine is used for mechanical stamping the laser head 61 and the lower block 62, carried respectively by their pallets 58' and 58", are placed on the storage device 55, that is to say in a stored position totally safe from the vibrations produced by the stamping operations.

The angled mirror, designated by reference 65, which brings the laser beam 66 which is initially radial into coincidence with the working axis 63 of the machine, is carried by a tube 67 which does not enter at its front end into a recess of the stamper, as in the first embodiment, but into the frame, designated by reference 68, of the laser head 61. The frame 68 is provided, for this purpose, with an opening 69 (FIG. 13).

The tube 67 is extended by a portion 67a of larger diameter passing through a ball-bearing guide sleeve 70 and which can move axially in the direction of the arrow 71. The guide sleeve 70 is carried by a membrane 72 in such manner that when the mirror 65 is in its retracted position, such as shown in FIG. 12, during the mechanical stamping it is resiliently supported by this membrane 72 and, consequently, safe from the vibrations produced by the stamping operations. When the mirror 65 occupies its working position, such as shown in FIG. 13, a frusto-conical bearing surface 73 of the tube 67-67a bears against a complementary seat 74 provided on an element 75 of the frame of the machine, which ensures precise positioning of the mirror.

I claim:

1. A machine for working sheet metal comprising:
    a. mechanical working means having a mechanical stamping axis, said mechanical means including a press and a slide member having a central aperture to permit passage of a laser beam;
    b. laser working means which are moveable between a working position and a retracted position, said laser means including a laser generator mounted laterally of said slide member for generating said laser beam substantially transverse to said stamping axis through said aperture, an oblique mirror mounted in a tube at one end thereof, which tube is traversed longitudinally by said laser beam, means for moving said tube longitudinally between a working position, in which said mirror is rigidly mounted on said machine, and a rest position, and means for resiliently supporting said mirror while in said rest position such that vibrations produced by a stamping operation are not transmitted thereto; and c. a laser head movable between a retracted position and a working position in which the laser head is located on the slide member, and control means for controlling the movement of said laser head between said working position and said retracted position.

2. A machine as claimed in claim 1, having a gantry shaped frame provided with two columns, in which one of the columns of the frame is provided with a recess adapted to receive the laser head when it occupies said retracted position.

3. A machine as claimed in claim 2, in which rails connect the center of the machine to said recess, said rails serving to guide movement of the laser head.

4. A machine as claimed in claim 3, in which a shock damping elastic device is interposed between the laser head and said column of the frame of the machine in which said recess is provided, in such manner that the vibrations produced by a stamping operation are not transmitted to the laser head.

5. A machine as claimed in claim 3, in which the laser head is connected to a jack which produces the displacements of the laser head along said guide rails.

6. A machine as claimed in claim 1, in which said tube carrying the mirror is itself supported by the frame of the machine by means of a membrane through which it passes, which ensures its connection with the rest of the machine when the tube is in said rest position, in such manner that the vibrations produced by the stamping operation are not transmitted thereto, this tube presenting a frusto-conical surface which bears against a seat of complementary shape on the frame of the machine when the tube is in said working position, in such manner that the position of the tube is then accurately determined.

7. A machine as claimed in claim 1, including means for adjusting the longitudinal position of the tube carrying the mirror, when it occupies said working position, in such manner as to allow adjustment of the position of the mirror in order to produce perfect coincidence of the reflected laser beam and the stamping axis.

8. A machine as claimed in claim 1, in which said slide member of the press is provided with a lateral recess in which the end of the tube carrying the mirror is engaged in such manner that the mirror is, in said working position, situated opposite the central opening of the said slide member through which it reflects the laser beam.

* * * * *